United States Patent [19]

Kobori

[11] 4,247,188

[45] Jan. 27, 1981

[54] AUTOMATIC EXPOSURE CAMERA

[75] Inventor: Toshio Kobori, Sakai, Japan

[73] Assignee: Minolta Camera Kabushiki Kaisha, Osaka, Japan

[21] Appl. No.: 818,634

[22] Filed: Jul. 25, 1977

[30] Foreign Application Priority Data

Aug. 10, 1976 [JP] Japan .................................. 51-95696

[51] Int. Cl.² ........................ G03B 17/18; G03B 17/38
[52] U.S. Cl. .................................... 354/60 E; 354/266
[58] Field of Search ...................... 354/53, 60 E, 60 L, 354/266; 352/170, 171

[56] References Cited

U.S. PATENT DOCUMENTS

| 3,678,821 | 7/1972 | Kitai | 354/60 R X |
| 3,868,700 | 2/1975 | Kocamoto | 354/288 X |

Primary Examiner—Michael L. Gellner
Assistant Examiner—William B. Pirkey
Attorney, Agent, or Firm—Wolder, Gross & Yavner

[57] ABSTRACT

An automatic exposure camera, for example a TTL light measuring camera including a light measuring circuit, an exposed condition indicating circuit, and a light information storage circuit includes a normally open semiconductor switch connecting the circuits to a source of energizing current and actuated to a closed condition in response to a conductor being coupled across its control input terminals, at least one of which is defined by the camera manually operated shutter release members. In one form the switch input terminals are connected to mutually insulated coaxial members forming the release button and exposed at their top and in another form such terminals are connected respectively to the camera body and an electrically insulated top exposed portion of the release member. Thus, merely touching the release button by the photographer energizes and activates the respective circuits.

16 Claims, 3 Drawing Figures

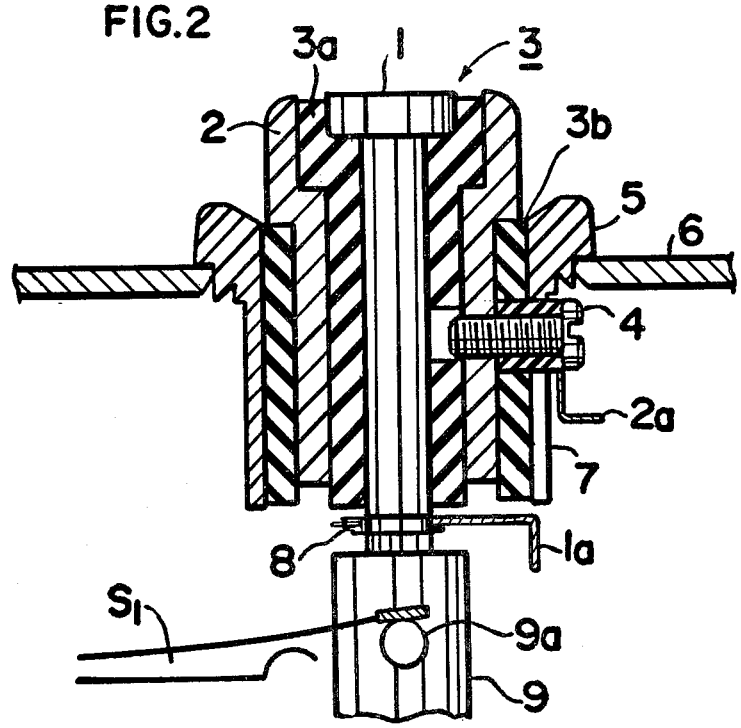
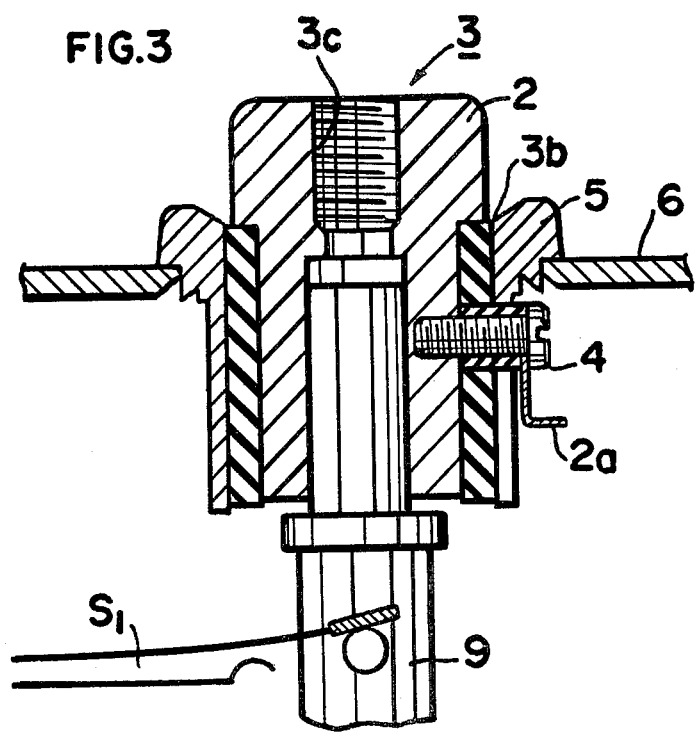

AUTOMATIC EXPOSURE CAMERA

BACKGROUND OF THE INVENTION

The present invention relates generally to improvements in a power source switch in an automatic exposure camera, and it relates more particularly to an improved power source switch in an automatic exposure camera provided with an exposure information indicating circuit.

In the automatic exposure camera, generally, electric power consumption by the light measuring circuit and the exposure time is appreciable and cannot be neglected. As a result, in an attempt to economize on electric power consumption, there is provided a normally-opened switch between the electric power source, and the light measuring circuit as well as the exposure-time control circuit, so that the switch may be brought to its closed position in association with the operation of a camera by the photographer so that current may be supplied to both the light measuring circuit and the exposure-time control circuit, only when such current is required. A conventional construction for facilitating the closing of a switch of this type is to arrange the switch as to cooperate with a release button so as to be closed when the release button is depressed. This arrangement permits the closing of the switch, immediately before the picture-taking operation, so that a reduction in the use of electric power may be most effectively achieved, and there is no possibility of the switch failing to be thrown, before the photographing sequence.

However, in the case of the prior art camera provided with an exposure information indicating circuit for indicating exposure information, based on the measurement derived from the light measuring circuit, the release button should be maintained in a half-way or semi-depressed condition so as to operate only the light measuring circuit and exposure information indicating circuit while preventing the shutter releasing operation for the purpose of confirming the exposure conditions or information. However, this procedure possesses the shortcoming in that, since the extent of the release button is initially depressed is determined by the photographer, there is a great risk of the release button being unintentionally depressed below that required for electrically energizing the respective light measuring and indicating circuits to a position initiating the photographing sequence so that an unwanted picture is taken.

In addition, with the prior art camera provided with the switch of the type above described, the stroke of the release button should be increased for actuating the switch in the course of depressing the release button. To this end, at least one of the members constituting the switch should be provided in the form of a movable contact. Accordingly, defective operation or malfunctioning will occur in the switch due to the excessive wear or damage of the contacting portions of the both contact members of the switch during their long service lives.

Furthermore, where a camera is provided with a light measurement storage circuit, that is, in the case of a TTL automatic exposure camera, object light which traverses the objective lens is first measured by the light measuring circuit, and then a movable reflecting mirror is swung out of the objective lens optical path whereupon the storage circuit is operated to electrically store the measurement derived from the light measuring circuit, before the measured object light is interrupted by the movable mirror thus swung, so that the exposure amount or time may be automatically controlled according to the measurement thus memorized or stored. In this case, during the period from the time when the light measuring circuit is activated until the shutter is released, the light measuring circuit should complete measuring the light, and the storage circuit should store the light measurement. However, the camera provided with the conventional or prior art switch fails to provide a sufficient time interval from the time the circuit energizing current is initiated to be fed in the course of depressing a release button until the shutter is released, so that if the release button is depressed too rapidly, then sufficient time may not be provided for the light measurement and storage thereof, thus leading to the failure to accurately store the measurement of the light.

SUMMARY OF THE INVENTION

It is a principal object of the present invention to provide an improved automatic exposure camera provided with an exposure information indicating circuit, which camera reduces the electric power consumption of the light measuring circuit and the indicating circuit.

It is another object of the present invention to provide an improved automatic exposure camera which obviates any unintentional photography due to inadvertent shutter-releasing operation by the photographer, when the photographer checks the exposure information prior to photography.

It is a further object of the present invention to provide an automatic exposure camera, which improves the durability of the switch means serving to control the current fed to the light measuring circuit and indicating circuit, and which minimizes the risk of excessive wear and damage to the switch means thereby insuring a consistant and accurate switching operation and a long service life of the switch means.

It is a still further object of the present invention to provided an improved automatic exposure camera provided with an exposure information indicating circuit, in which the measurement of the light is stored and the automatic exposure is effected based on the measurement thus stored, the camera being characterized in that during the time interval from the commencement of the circuit energizing current until the shutter release is actually effected, the aforesaid storage circuit may be operated long enough to assure its accuracy.

It is a common practice that, upon photography, the photographer is likely to touch a release button with his finger sufficiently long enough before the shutter-release button is operatively depressed. This is a quite natural and universal action or motion of the photographer. The present invention is based on the aforesaid action or motion, and provides an automatic exposure camera which may attain the aforesaid objects by providing switch means, in which the energizing current is fed to the light measuring circuit, storage circuit, exposure information indicating circuit and the like merely in response to the photographers' finger or hand touching the release button.

BRIEF DESCRIPTION OF THE DRAWINGS

FIG. 2 is a longitudinal cross-sectional view of one embodiment of a release button for use in a camera provided with the circuit of FIG. 1; and FIG. 3 is a longitudinal cross-sectional view showing another embodiment of a release button for use in the camera provided with the circuit of FIG. 1.

DESCRIPTION OF THE PREFERRED EMBODIMENT

Figure 1:
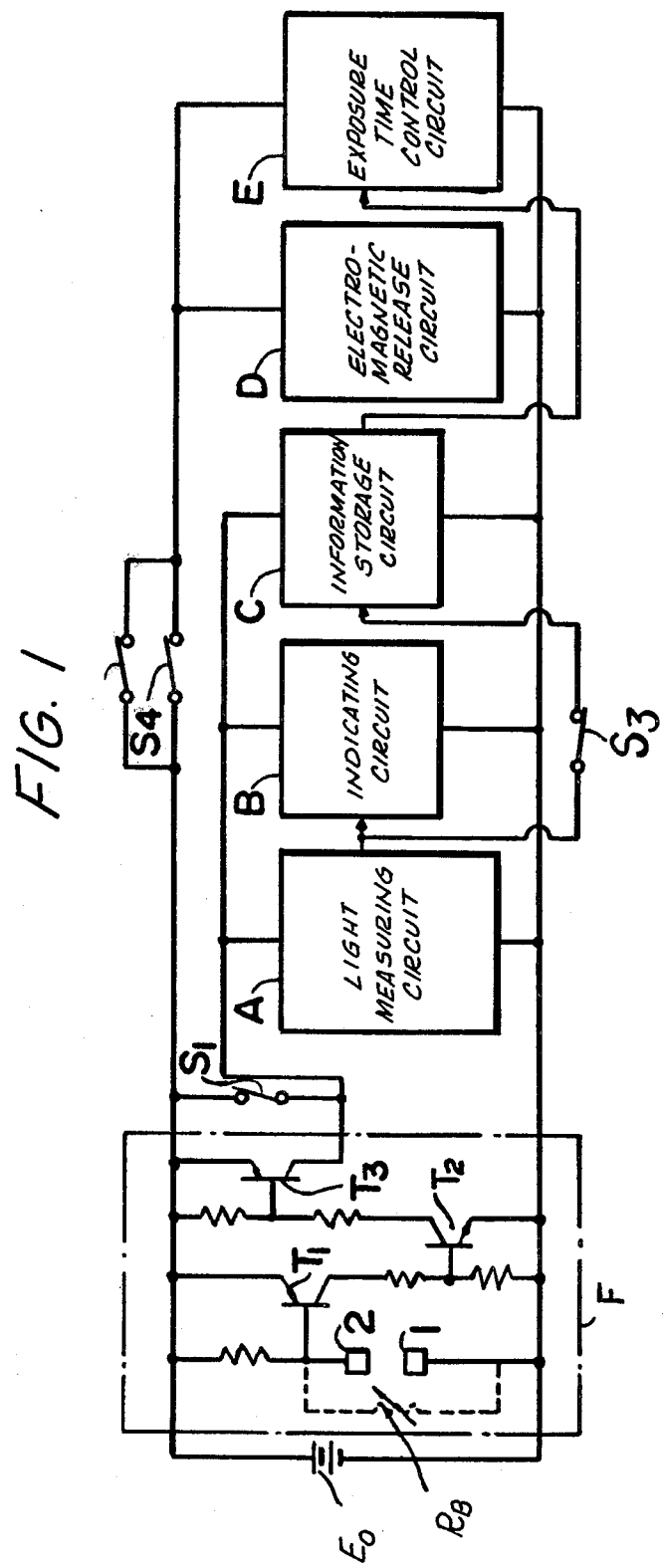
FIG. 1 is a circuit diagram of one embodiment of the invention.

Referring now to the drawings, particularly FIG. 1 thereof which illustrates a preferred embodiment of the present invention, A generally designates a light measuring circuit, B an indicating circuit adapted to visually indicate the measurement of light, C a storage or memory circuit for storing the measurement of light, D an electromagnetic release circuit, and E an exposure time control circuit. A safety switch S1 adapted to be closed in the initial phase of depressing a release button feeds current to light measuring circuit A, indicating circuit B and storage circuit C. The present invention features a semi-conductor switch F including a transistor T3 arranged in parallel with the switch S1. The transistor T3 serves as a switch in parallel with the switch S1. A switch S2 feeds current to electromagnetic release circuit D and exposure time control circuit E, and is adapted to be closed due to or following the depression of a release button, after switch S1 has been closed. When switch S2 is closed, then electromagnetic release circuit D is operated, and memory switch S3 is opened, so that storage circuit C is disconnected from light measuring circuit A, and the storage circuit C stores the light measurement thus obtained. Then, a mirror-presetting mechanism of known construction is operated to swing the mirror upwards. A switch S4 arranged in parallel with switch S2 is adapted to be closed by means of the mirror presetting mechanism, thus allowing the continued feeding of current to exposure time control circuit E, even if the finger is kept off the release button after the electric release circuit D has been operated. Exposure time control circuit E is controlled according to the information stored in the storage circuit C so as to close the shutter after a given lapse of time.

A block F shown by a broken line and including transistors T1, T2 and T3 and associated components, the output transistor T3 being arranged in parallel with switch S1, represents a finger-touch responsive switch circuit for starting to feed a current to light measuring circuit A, indicating circuit B, storage circuit C and the like. Shown at 1 and 2 in block F are opposed electrodes built in or associated with the release button, in which when a finger comes in touch with the release button, then there is incurred a resistance RB of the human body between the electrodes 1 and 2 in an electrically equivalent basis, so that a base current flows in transistor T1 which is then brought into a conductive condition, and so is transistor T3. Since transistor T3 is arranged in parallel with switch S1, the current feeding is commenced for the light measuring circuit and the like due to the conductive condition of transistor T3, as a result of the photographer's or operator's finger touching the release button, before switch S1 is closed.

FIGS. 2 and 3 show embodiments of the release button according to the present invention. Shown at 3 is a release button and at 6 a camera body. In the embodiment of FIG. 2, electrodes 1, 2 are positioned in concentric relation, with an insulating bushing 3a interposed therebetween. Electrodes 1, 2 and insulating bushing 3a constitutes a release button. The top surfaces of electrodes 1, 2 and insulating bushing 3a are substantially flush with each other, representing the top surface of the release button. When a finger touches this top surface, then electrodes 1,2 are electrically connected by an electrical conductor through the medium of the touching or engaging finger. Shown at 3b is a bushing adapted to provide insulation between elctrode 2 and the button seat 5. Electrode 1 extends downwards and abuts release shaft 9 made of insulating material at its lower end. Pin 9a radially projecting from release shaft 9 engages a movable arm or piece of switch S1, and thus when button 3 is depressed, the switch S1 is closed. A contact piece or terminal 1a is fitted in an annular groove provided in electrode 1 and a washer 8 rigidly secures contact piece 1a in position. A radially extending screw 4 is threaded in electrode 2 and a contact piece or terminal 2a is secured to screw 4. Shown at 7 is an insulator bushing providing insulation between screw 4 and button seat 5. Lead wires are connected to contact pieces or terminals 1a, 2a so that electrode 1,2 are electrically incorporated in the circuit of FIG. 1.

FIG. 3 illustrates another embodiment of the invention in which the electrode 1 of the embodiment of FIG. 2 is obviated and the camera body 6 corresponds to and functions as electrode 1. A cable releasing screw hole 3c is provided in the top surface of electrode 2. When a camera is held for taking pictures, then the body 6 is grasped and touched by the photographer's hands, with the result that when a finger touches the release button, then the electrode 2 is rendered conductive to camera body 6 through the medium of the photographer's hand. This arrangement is used, in case one of the semi-conductor switch circuit terminals is grounded to the camera body.

As is apparent from the foregoing description, a current may be fed to the light measuring circuit and the like, due to only a finger touching the release button, before the button is depressed, thereby permitting an accurate light measuring operation, while a current may be fed to the aforesaid circuits long before, so that a saving in electric power may be attained. Moreover, as has been described earlier, according to the prior art camera, the release button is depressed half way so as to operate the light measuring circuit and indicating circuit alone, while precluding a shutter releasing operation for viewing an exposure indication, and thus there often arises the commission of an error in releasing the shutter. In contrast thereto, according to the present invention, the mere touching of the finger to the release button enables the current feeding to the light measuring circuit and indicating circuit, so that confirmation of exposure indication may be effected without any failure, thus allowing the photographer to entirely commit himself to the taking of a picture.

As shown in the aforesaid embodiments, the current feeding switch S1 cooperative with the release button is provided in parallel with the finger-touch responsive switch, so that the camera may be handled in the same manner as a prior art camera, with the photographer wearing gloves.

While there have been described and illustrated preferred embodiments of the present invention, it is apparent that numerous alterations, omissions and additions may be made without departing from the spirit thereof.

I claim:

1. In an automatic exposure camera which includes: a release member movable between a retracted position and an advanced position for initiating exposure; a light measuring circuit for measuring the light value of a viewed object; a circuit for indicating exposure information based on the light value derived from said light measuring circuit; and a power source for supplying energizing current to said light measuring circuit and to said exposure information indicating circuit, whereby exposure may be controlled according to said light measurement; the improvement comprising: a first contacting portion provided as at least part of the top surface of said release member; a second contacting portion provided on the camera at a position manually touched by a photographer upon using said camera; insulating means for mutually electrically insulating said first and second contacting portion; and a switching circuit connecting said power source to said light measuring circuit and to said exposure information indicating circuit, for controlling the energizing current to said light measuring circuit and exposure information indicating circuit, said switching circuit including two terminals which are independently connected to said first and second contacting portions, respectively, said switching circuit being normally maintained in a relatively open condition interrupting the current to said light measuring circuit and to said exposure information indicating circuit and being actuated in response to a conductor body such as a hand touching both said first and second contacting portions to close and render it conductive, thereby feeding energizing current to said light measuring circuit and to said exposure information indicating circuit.

2. The improvements as set forth in claim 1, wherein said second contacting portion is formed on said release member, and positioned substantially in the same plane as said first contacting portion.

3. The improvements as set forth in claim 2, wherein said release member includes a core member formed of an electrically conductive material, a tubular member surrounding said core member and formed of an electrically conductive material and movable integrally with said core member, the top surfaces of said core member and said tubular member being substantially coplanar; said first contacting portion being formed integrally with said core member as the top surface thereof; said second contacting portion being formed integrally with said tubular member as the top surface thereof; and said insulating means being a sleeve formed of an insulating material and sandwiched between said core and tubular members.

4. The improvements as set forth in claim 1, wherein said second contacting portion comprises an outer surface of a body of the camera separate from said release member, and one terminal of said switching circuit is grounded to the camera body.

5. The improvements as set forth in claim 1, wherein said camera further comprises: a safety switch connected in parallel with said switching circuit, and controlling the energizing current to said light measuring circuit and exposure information indicating circuit, said safety switch being normally maintained in an open condition, and adapted to be closed in the course of said release member moving from its retracted position to its advanced position.

6. In an automatic exposure camera which includes: a release member movable between a retracted position and an advanced position for initiating exposure, a light measuring circuit for measuring the light value of a viewed object, a storage circuit for storing the measurement of light derived from said light measuring circuit, and a power source for supplying a current to said respective circuits, whereby exposure amount may be automatically controlled based on the measurement of light stored in said storage circuit, the improvements comprising: a first electrical contacting portion formed at least as part of the top surface of said release member; a second electrical contacting portion provided on the camera at a position where it is manually touched by the photographer when the photographer effects use of said camera; insulating means for mutually electrically insulating said first and second contacting portion; a switching circuit between said respective circuits and said power source for controlling the energizing current to each of said circuits, said switching circuit including two input control terminals which are independently connected to said first and second contacting portions, respectively, and said switching circuit being normally maintained in a relatively open condition interrupting the current to said respective circuits, and being actuated in response to a conductor body such as a hand touching both of said first and second contacting portions to relatively close said switching circuit, thereby feeding energizing current to said respective circuits.

7. The improvements as set forth in claim 6, wherein said second contacting portion is formed on said release member, and positioned substantially in the same plane as said first contacting portion.

8. The improvements as set forth in claim 7, wherein said release member includes a core member formed of an electrically conductive material, a tubular member surrounding said core member and formed of an electrically conductive material and movable integrally with said core member, the top surfaces of said core member and said tubular member being substantially coplanar; said first contacting portion being formed integrally with said core member as the top surface thereof; said second contacting portion being formed integrally with said tubular member as the top surface thereof; and said insulating means being a sleeve formed of an insulating material and sandwiched between said core and tubular members.

9. The improvements as set forth in claim 8, wherein said switching circuit includes: a first transistor whose base terminal is connected between said power source and one of said contacting portions, whereby said transistor is rendered conductive when said first contacting portion is conductively connected to said second contacting portion; and a second transistor connected between said power source and said respective circuits, and rendered conductive when said first transistor is conductive thereby feeding current to said respective circuits.

10. The improvements as set forth in claim 6, wherein one of said contacting portions forms an outer surface of the body of the camera separate from said release member, and one terminal of said switching circuit is grounded to the camera body.

11. The improvements as set forth in claim 6, wherein said camera further comprises: a safety switch connected in parallel with said swiching circuit, and controlling the current fed to said light measuring circuit and storage circuit, said safety switch being normally maintained in an open condition, and adapted to be closed in the course of said release member moving from its retracted position to its advanced position.

12. The improvements as set forth in claim 6, wherein said camera further comprises: an exposure information circuit controlled by said switching circuit for the current feeding thereto, and indicating an exposure information based on the measurement of light which is derived from said light measuring circuit.

13. A camera comprising a body, a shutter release member positioned on said body and manually movable from a retracted to an exposure initiating advanced condition, a current source, a semiconductor switch circuit having an output transferrable between relatively open and closed conditions and a control input and being normally maintained in open condition, means responsive to an electrical parameter of a person touching said release member for applying a signal to said switch circuit input which transfers said output from an open to a closed condition and a light responsive circuit connected through said switch circuit output to said current source.

14. The camera of claim 13 wherein said signal applying means comprises a pair of mutually insulated electrical contact elements exposed at a finger receiving face of said release member.

15. The camera of claim 13 wherein said signal applying means comprises a pair of mutually insulated electrical contact elements and one of which is exposed at a finger receiving face of said release member and the other contact element being disposed on said body, said contacts being bridgeable by the hand holding the camera and engaging the release member.

16. The camera of claim 13 wherein said parameter is the electrical conductivity of the hand of a person holding the camera.

* * * * *